(12) United States Patent
Pereira et al.

(10) Patent No.: US 9,792,585 B2
(45) Date of Patent: Oct. 17, 2017

(54) MOBILE APPLICATION MANAGEMENT

(75) Inventors: Wesley Pereira, Kirkland, WA (US);
Hong Zhang, Redmond, WA (US)

(73) Assignee: Google Inc., Mountain View, CA (US)

(*) Notice: Subject to any disclaimer, the term of this patent is extended or adjusted under 35 U.S.C. 154(b) by 81 days.

(21) Appl. No.: 13/529,077

(22) Filed: Jun. 21, 2012

(65) Prior Publication Data

US 2013/0346268 A1 Dec. 26, 2013

(51) Int. Cl.
*G06Q 10/10* (2012.01)
*G06F 9/445* (2006.01)

(52) U.S. Cl.
CPC .......... *G06Q 10/10* (2013.01); *G06F 8/65* (2013.01)

(58) Field of Classification Search
CPC ............... G06Q 10/06313; G06Q 10/06315
USPC .................. 705/26.8; 726/27; 455/414.1
See application file for complete search history.

(56) References Cited

U.S. PATENT DOCUMENTS

| | | | |
|---|---|---|---|
| 8,381,189 B2 | 2/2013 | Surazski et al. | |
| 8,484,346 B2 | 7/2013 | Lipscomb et al. | |
| 8,549,656 B2 | 10/2013 | Blaisdell et al. | |
| 8,554,653 B2 | 10/2013 | Falkenborg et al. | |
| 2011/0185354 A1 | 7/2011 | Tanner et al. | |
| 2011/0231280 A1* | 9/2011 | Farah | G06Q 10/10 705/26.8 |
| 2011/0252415 A1 | 10/2011 | Ricci | |
| 2012/0129503 A1* | 5/2012 | Lindeman | H04W 4/001 455/414.1 |
| 2012/0140774 A1* | 6/2012 | Oster | H04L 45/00 370/401 |
| 2012/0210443 A1* | 8/2012 | Blaisdell | G06F 21/12 726/27 |
| 2013/0067072 A1* | 3/2013 | Gupta | G06F 11/3006 709/224 |

(Continued)

FOREIGN PATENT DOCUMENTS

WO 2012012777 1/2012
WO 2013119076 8/2013

OTHER PUBLICATIONS

'MacRumors' [online]. "How does a business use the Mac App Store," Jun. 15, 2011 [retrieved on Mar. 11, 2014]. Retrieved from the internet: URL<http://forums.macrumors.com/showthread.php?t+1170731>, 7 pages.

(Continued)

*Primary Examiner* — Rokib Masud
(74) *Attorney, Agent, or Firm* — Fish & Richardson P.C.

(57) ABSTRACT

A computer-implemented method may include determining whether a computing device accessing an online application marketplace is associated with a particular business entity registered with the online application marketplace. The method may further include identifying applications that were selected by a representative of the particular business entity to be identified to users whose devices are determined to be associated with the particular business entity. The method may still further include providing data for displaying the applications and a control for downloading executable code for at least one of the applications, receiving an indication that the control has been selected by the user to download the executable code for the applications, and providing the executable code for the at least one of the applications.

18 Claims, 7 Drawing Sheets

(56) References Cited

U.S. PATENT DOCUMENTS

2013/0095785 A1* 4/2013 Sadana ................ H04W 4/003
　　　　　　　　　　　　　　　　　　　　　　　　　　　455/406
2013/0212160 A1　8/2013 Lawson et al.

OTHER PUBLICATIONS

'Ask Different' [online]. "How to setup iTunes account in a business environment and can you share app purchases?" 2012 [retrieved on Mar. 11, 2014]. Retrieves from the internet: URL<http://apple.stackexchange.com/questions/29204/how-to-setup-itunes-account-in-a-business-environment-and-can-you-share-app-purc>, 2 pages.
Fass, "Apple's Mac App Store is Great for Consumers but a Big Problem for Business," Feb. 23, 2012 [retrieved on Mar. 11, 2014]. Retrieved from the internet: URL<http://www.cultofmac.com/148229/apples-mac-app-store-is-great-for-consumers-but-a-big-problem-for-business/>, 6 pages.
Cox, John. "Partnerpedia boosts IT management of Google Android and Apple iOS mobile apps"; NetworkWorld; Publication [online]. May 20, 2011 [retrieved Jun. 21, 2014]. Retrieved from the Internet: <URL: http://www.networkworld.com/article/2177399/mobile-apps/hosted-service-creates-enterprise-store--for-android--ios-apps.html>, pp. 1-4.
International Search Report and Written Opinion in International Application No. PCT/US13/46808, mailed Aug. 5, 2014, 9 pages.

\* cited by examiner

MOBILE APPLICATION MANAGEMENT

TECHNICAL FIELD

The present disclosure relates generally to the management of mobile applications.

BACKGROUND

Portable computing devices (e.g., smartphones, tablet computers, etc.) are becoming increasingly popular, powerful, and sophisticated. Modern smartphones, for example, may download and execute a number of different applications, including particular applications that a user of a smartphone has purchased or otherwise received from an on-line marketplace.

In many instances, a user of a portable computing device uses their particular device for both personal and business purposes. For example, a user may access a social networking application while away from work, but may use an electronic mail client that is directed specifically to an account at the user's employer.

SUMMARY

This document relates to systems and techniques for making particular computer applications available to a particular defined group of people via an online application marketplace. A typical application marketplace may make available many thousands of applications for download, and may allow users to search for particular titles or categories, select a button to see popular or new applications, or provide other such mechanisms for narrowing down the applications that a user may want to download to their device. As described below, a system that operates an application marketplace may allow certain users to arrange one more applications into groups, and associates those groups of applications with particular types of users.

For example, a particular administrator associated with a business entity may establish an account for that entity with an application marketplace. The administrator may then determine which applications should be possessed by particular workers at the business entity. For example, an IT committee at the organization may have reviewed all the possible application offerings, and decided that members of the marketing department should have a certain group of applications, while members of the engineering department should have a different group of applications. Certain of the applications may be available only upon the payment of a fee, and the administrator may associate the entity's account with a payment mechanism (e.g., e-payment account or credit card number for the entity), and may agree that downloads of such applications by employees of the business entity will be paid for by the account of the entity. The marketplace may provide a user interface (UI) and an application programming interface (API) to the administrator by which, for example, the administrator may identify groups (e.g., engineering and marketing), and may drag icons that represent particular applications into areas of the UI that represent those particular roles within the business entity. The administrator may also optional identify particular users who occupy such roles, such as by identify electronic mail addresses for each other user that the entity authorizes to view the grouped applications and to obtain the applications on behalf of the business entity, and as paid for by the business entity.

In certain other situations, the administrator may simply make groups of applications that are to be made available to, and shown to any member of the public. For example, a tech columnist could group his or her favorite applications into a single group, and visitors to the application marketplace may subsequently see the group. For example, a reader of columnist David Pogue could type "Pogue" as a submitted search term to the marketplace, and the search results could include an application for playing music from the band The Rogues, and could also include a link, that when selected by a user, takes the user to a page that lists the applications that were previously selected and identified by David Pogue. The user may then bulk-download the applications by selecting a control displayed on the page for triggering such an action. To the extent any of the applications require payment, the marketplace may display a request to the user so that the user confirms that he or she agrees to have the total amount of the payment (e.g., the combined cost of all the paid applications) charged to the user's personal account. If the user has not provided log-in credentials recently, the system may also ask the user to provide such credentials.

In the example of an administrator for a business entity posting groups of online downloadable applications for employees or others at the business entity, such users may initially log-in (or they may have previously logged in, and then subsequently visited an area of the marketplace dedicated to the business entity). When the user accesses the online application marketplace using their device in such a manner, a listing of mobile applications may be presented to the user based on their association with the business entity. Their association with the business entity may be identified, for example, by identifying that the e-mail address associated with their account matches an e-mail address that the administrator previously provided. The association can also be determined by identifying that a domain for the user's e-mail (which may have been used as a credential for forming an account with the marketplace) matches a domain that the administrator provided for the entity. Thus, for example, anyone with a "@company.com" e-mail address can be presumed to be an employee of the "company," and can be presumed to be authorized to access relevant online applications that have previously been identified by the administrator as applications to be provided to employees of the "company."

The applications that are presented to a user may also be filtered and group in particular manners. For example, a user may identify his or her role (such as by job title or the department or division in which the user works) and the system may identify applications that the administrator previously selected as being relevant to that role. Separately, the administrator may have associated each user with a role when setting up an account, so that the user's role may be determined as soon as the user accesses the application area. Such role-based applications can be displayed to the user in an area that is visually separated (e.g., via a box) from other parts of a user interface, and a selectable control may be provided, which selection will cause all of the applications in the group to be downloaded to the user's currently logged-in device. Other applications may be displayed in another area. For example, general applications that may be determined to be relevant to the user's role (e.g., applications that a system determines to have characteristics similar to those selected by the administrator for that role) may be displayed in a separate area to indicate that they may be relevant, but to also indicate that they are not part of the standard "package" of applications supported by the business entity (and perhaps that the user needs to pay for them himself or herself). Certain other applications may be organization-specific application. Thus, while the first group of application may have been particular selected applications that any user could obtain by accessing the marketplace, the organization-specific application may be made available only to users who have credentials for the particular business entity. Such application may include certain applications that an organization's internal IT department has developed for employees, and not for people outside the organization. Such applications may have been uploaded to the marketplace by the administrator just like public applications are uploaded, but with the administrator marketing them as private to the business entity. Yet another area may simply show other applications on the marketplace, such as the currently most-popular business applications (which may differ from the currently most popular games, which would be shown to other users who log-into the marketplace but who are not identified as being associated with a particular business entity).

Certain data to be downloaded for use with an application (that is separate from the application) can also be managed by the administrator. For example, the administrator may select a certain contact management application to be downloaded for every marketing employee in a company. Separately, the administrator may upload a data file containing contact data for employees in the marketing department, and for key customers and customer contacts of the company. The administrator may associate the data with the application in the marketplace, so that when the marketplace causes the contact application to be downloaded to a user's device, it also causes the contact data to be downloaded in a manner that the contact data is shown to the user when the user launches the application. Other content may also be provided by an administrator to be used by third-party applications that members of the administrator's organization download, such as organization-specific templates for presentations and other such content and other information.

Such techniques may, in certain implementations, provide one or more advantages. For example, an organization can easily manage the applications that its employees have loaded to their computing devices from an online application marketplace, and can easily pay for the downloaded of applications that require payment, while maintaining security over who can download the applications. The organization can also control the data that is downloaded with applications, even where those applications are provided by a third-party such as by a commercial software development company. Moreover, the organization can provide such access without having to host and manage its own marketplace or other distribution mechanism or web site. At the same time, employees of the organization can be left free to add "non-organizational" applications that they may want (though the organization can also limit which other applications can be downloaded when the device is owned by the organization, such as by blocking game downloads on organization-owned devices or blocking all applications that seek access to device memory or pother particular device assets that may create security concerns).

Additionally, the marketplace may provide a UI and/or an API that allows an administrator to remotely manage applications such as, for example, allowing for remote install/uninstall of applications, as well as remote configuration of applications. Further, the UI and/or API may allow for the remote collection of crash reports and other statistical data. Such actions may be performed on private applications published to the marketplace by the administrator, whereas the marketplace may restrict the administrator from remotely interacting with non-private applications on the marketplace.

In one implementation, a computer-implemented method is disclosed. The method comprises determining, by a system operating an online application marketplace, whether a computing device accessing the online application marketplace is associated with a particular business entity registered with the online application marketplace; identifying, by the system and based on determining that the computing device accessing the online application marketplace is associated with the particular business entity, a plurality of applications that were selected by a representative of the particular business entity to be identified to users whose devices are determined to be associated with the particular business entity; providing, from the system to the computing device for presentation on the computing device, data for displaying the plurality of applications and a control for downloading executable code for at least one of the plurality of applications; receiving at the system an indication that the control has been selected by the user to download the executable code for the at least one of the plurality of applications; and providing, from the system to the computing device, the executable code for the at least one of the plurality of applications.

In another implementation, a computer-implemented system is disclosed. The system comprises an on-line application marketplace server system; a business entity front-end programmed to interact with representatives of one or more organizations to enable the representatives to specify applications to be highlighted to users who are identified by the system as being associated with particular ones of the organizations; a consumer front-end for generating information for receiving requests from computer users to be presented with applications available to the users; and an application selector that identifies whether a particular user corresponds to a particular entity that has had a representative specify applications to be highlighted, and to select a sub-set of applications to present to the particular user based on a group of applications specified by the representative.

In still another implementation, at least one machine-readable storage media is disclosed. The machine-readable storage media has instructions recorded thereon that when executed by one or more computer processors, perform operations comprising determining, by a system operating an online application marketplace, whether a computing device accessing the online application marketplace is associated with a particular business entity registered with the online application marketplace; identifying, by the system and based on determining that the computing device accessing the online application marketplace is associated with the particular business entity a plurality of applications that were selected by a representative of the particular business entity to be identified to users whose devices are determined to be associated with the particular business entity; providing, from the system to the computing device for presentation on the computing device, data for displaying the plurality of applications and a control for downloading executable code for at least one of the plurality of applications; receiving at the system an indication that the control has been selected by the user to download the executable code for the at least one of the plurality of applications; and providing, from the system to the computing device, the executable code for the at least one of the plurality of applications.

The details of one or more implementations are set forth in the accompanying drawings and the description below.

Other features and advantages will be apparent from the description and drawings, and from the claims.

DESCRIPTION OF THE DRAWINGS

In the drawings, like reference numbers refer to similar elements throughout.

DETAILED DESCRIPTION

Figure 1:
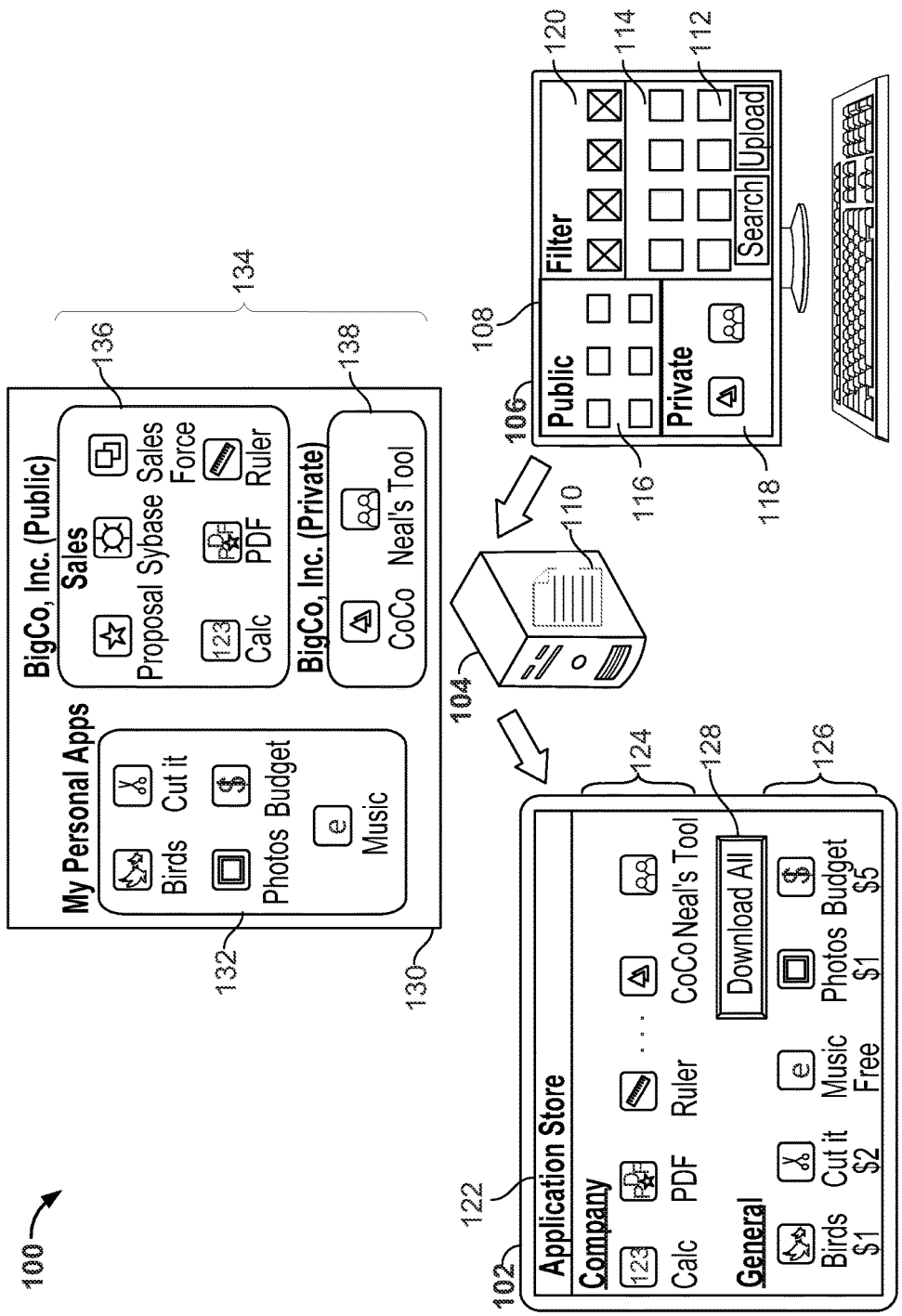
FIG. 1 shows a conceptual diagram of an example system for implementing mobile application recommendations.

FIG. 1 shows a conceptual diagram of an example system 100 for implementing mobile application recommendations. In general, the system 100 permits organizations to readily identify and group applications (and potentially associated data for those applications) that should be made available to members of the organizations when those members log-into an online marketplace using credentials that have been associated with the registered organizations (e.g., logged in using an e-mail domain for the organization or an e-mail domain or full e-mail address that the organization has previously identified as being associated with it).

In the example of FIG. 1, the system 100 includes a user device 102, an application marketplace server 104, and an administrator device 106. The user device 102 is a hand-held computing device (e.g., a smartphone) that is used by an employee of a particular business entity or other organization (e.g., a corporation). In general, the user device 102 is multi-purpose, used by the employee to serve both personal and professional needs. The application marketplace server 104, in contrast, is a business system that includes at least one server computing device that implements an online software store that allows consumers to, among other things, browse and download mobile applications to compatible computing devices, such as the user device 102.

The administrator device 106 is also a computing device, and in this example provides an interface 108 that enables an individual associated with the particular organization (e.g., an IT administrator) to define at least one policy 110 (e.g., shown as currently stored on the application marketplace server 104) that specifies, as a recommendation or requirement to the employee, at least one mobile application for installation on the user device 102. Such a framework generally allows the particular organization to manage applications installed on the user device 102, without any configuration or set-up required by the employee. While a particular administrator is referenced in this example, multiple individuals in the organization may act together to establish such access. For example, a businessperson may identify applications to be made available to members of an organization, while an IT person may upload content that is to be provided to such members along with the applications when those members download the applications.

For example, an IT administrator may, as part of a "policy-definition phase," optionally select a particular mobile application 112 from a plurality of applications listed in a general pane 114 within the interface 108, for placement (e.g., via "drag and drop") to one of a public pane 116, a private pane 118, and a filter pane 120. In this example, placement of the mobile application 112 to the filter pane 120 effectively "black-lists" the mobile application 112 and, in some implementations, at least temporarily prevents employees of the organization from downloading the mobile application 112, such as to the user device 102, as discussed in further detail below. The administrator may also "black list" applications by category, such as by checking entries in a list of application types (e.g., specifying that games cannot be downloaded, or that applications having adult content or a rating above a certain level cannot be downloaded to devices that are logged-in to the marketplace using credentials that correspond to the organization).

In contrast, placement of the mobile application 112 to the public pane 116 populates the policy 110 with a reference (e.g., a unique application identifier) to the mobile application 112 and designates the mobile application 112 as a publicly-available mobile application. In this example, a publicly-available mobile application refers to a mobile application that is accessible to the general public (e.g., unrestricted availability) through the application marketplace server 104, and that is shown to members of the organization when they access the marketplace using credentials associated with the organization.

Placement of the mobile application 112 to the private pane 118 also populates the policy 110 with a reference to the mobile application 112. However, in such an instance, the mobile application 112 is designated as a privately-available mobile application, or a mobile application that is accessible only to authorized employees of the particular organization (e.g., restricted availability) through the application marketplace server 104. Typically, a privately-available application is one that the IT administrator or another employee of the organization previously uploaded to the marketplace (and that was written specifically for the organization), and is not a regular application that would otherwise be available to people from outside the organization. As discussed in further detail below, designation of a particular mobile application as a publicly-available mobile application, or a privately-available mobile application, at least enables the logical itemization or arrangement of mobile applications for display on the user device 102 for easy identification and access by the employee.

The policy 110 may be expressed and stored in a variety of ways. For example, a relational database may store associations between particular credentials and accounts for an organization (e.g., the IT administrator may open an account with the marketplace via an e-mail account for the general IT department, such as "admin@example.com"). Relations may also be made to other such account information, such as an e-payment account number and credentials, a credit card number and related payment information, and the like. The database may also include a table that stores lists of identified applications in association with an ID number for the organization, along with a field that indicators the type of application (e.g., private or public) or other grouping into which the particular selected application has been placed. For example, a field may indicate a name of a group or groups (e.g., marketing, engineering, etc.) that are to be allowed to download the particular application. The policy 110 may also indicate other factors that may be used to present applications and provide then for download in the manners discussed above and below.

The policy 110, following definition by the IT administrator and as part of a "policy-implementation phase," may be provided to the application marketplace server 104 (e.g., as shown in FIG. 1). Subsequently, as the employee uses a browser 122 or dedicated marketplace application provided by the user device 102 to access the online software store, as implemented by the application marketplace server 104, the application marketplace server 104 may correlate the policy 110 with the employee and/or the user device 102 (upon correlating the device with a user account, and correlating the user account to the organization's account). For example, the application marketplace server 104 may resolve or determine at least one credential that is associated with the employee and/or the user device 102, and then link the policy 110 to the employee and/or the user device 102 upon determining that the credential is associated with the organization.

For example, as the user points the browser 122 to a home page of the online software store, the browser 122 may forward user-specific credentials to the application marketplace server 104. The user-specific credentials may be used by the application marketplace server 104 to link the policy 110 to the employee and/or the user device 102. For example, the user-specific credentials may correspond to a username/password combination (e.g., username: corporate e-mail address; password: corporate log-in password) used by the employee to log-in to the user device 102. In this manner, and as described in further detail below, there is no configuration or setup (e.g., downloading and installing a separate application to the user device 102) required by the user to access a listing of mobile applications recommended by the IT administrator. The association of the user account to the organization account may be determined, for example, by the domain name of the organization in the user's credentials, or by the user's credentials matching credentials (e.g., an e-mail address) that were provided by the IT administrator in the earlier phase (though the phases discussed here may be performed in various orders, such as when an IT administrator adds a new employee to a list of employees who are to have access to the organization-specific portion of the marketplace).

Continuing with the present example, at least a first listing 124 may be presented to the employee within the browser 122 once the policy 110 is associated with the employee and/or the user device 102 by the application marketplace server 104. In this example, the first listing 124 may include the mobile applications previously specified within the policy 110 by the IT administrator, as described above. In some implementations, a second listing 126 may also be displayed to the employee within the browser 122, including mobile applications that are commonly presented to consumers as they access the application marketplace server 104 (e.g., "most popular" mobile applications that are displayed for viewing once the user reaches a home page of the online software store).

The employee may then optionally select one or more of the mobile applications within the first listing 124, and the second listing 126 when presented, for installation to the user device 102. For example, the employee may select a control 128 within the browser 122 to download and install each of the mobile applications within the first listing 124 and the second listing 126 in a single motion (e.g., via "tapping" the control as display within the browser 122 with a finger, resulting in all of the applications being downloaded in-turn automatically).

The application marketplace 104 may then automatically charge a business account associated with the particular organization for the mobile applications within the first listing 124, and charge a personal account associated with the employee for the mobile applications within the second listing 126, as discussed in further detail below. Additionally, as noted above, the credential information for charging the business account may have previously been provided by the IT administrator or another administrator, who in that process may have agreed that the organization may be billed for any downloads made by qualified individuals (e.g., all individuals who have an e-mail address from the organization's internet domain, or all individuals in a list of e-mail addresses that the IT administrator provides to the application marketplace server 104.

Following installation of, for example, the mobile applications within the first listing 124 and the second listing 126 to the user device 102, the respective mobile applications may be organized on a desktop screen 130 of the user device 102 as a personal listing 132 and a business listing 134, where each such group is visually separated from the other group, such as by being outlined by a box around each respective group. In some implementations, the business listing 134 may be partitioned into a public listing 136 and a private listing 138. In such an example, the public listing 136 may include publicly-available mobile applications, or mobile applications that are accessible to the general public through the application marketplace server 104. The private listing 138, in contrast, may display privately-available mobile applications, or mobile applications that are applications accessible only to authorized employees (e.g., the employee of the present example) of the particular organization (e.g., "BigCo, Inc.") through by the application marketplace server 104. In this manner, the example system 100 enables the itemization or organization of personal and business mobile applications for display on the user device 102 for easy identification and access by the employee.

The particular applications shown to a user may vary based on the user's identified role within the organization. As one example, when an administrator selects applications to make available to members of the organization, the administrator may first select a sub-set of members to whom the selection applies. For example, the administrator may first select a "marketing" group and then select a number of applications for that group (e.g., contact managers, travel applications, etc.). The administrator may then switch to an "engineering" group and select a plurality of other applications, some of which may be the same as those selected for the marketing group and some that may be different. Subsequently, the administrator may identify to the system e-mail addresses of each of the people in the two departments. The system may use such identification to associate the e-mail addresses with the applications identified for the particular department, and when the employees log-in to obtain applications, they may provide their e-mail addresses, which may then be used to associate them with their identified department, and then with the applications that the administrator selected for the department. Although grouping by department is identified here, users may be grouped in other manners too (e.g., C-level executive may be correlated to a particular set of applications), and the correlation may be across multiple dimensions (e.g., the executive vice-president of marketing may be shown and provided all applications assigned to the marketing department and all application for C-level executives).

Figure 2:
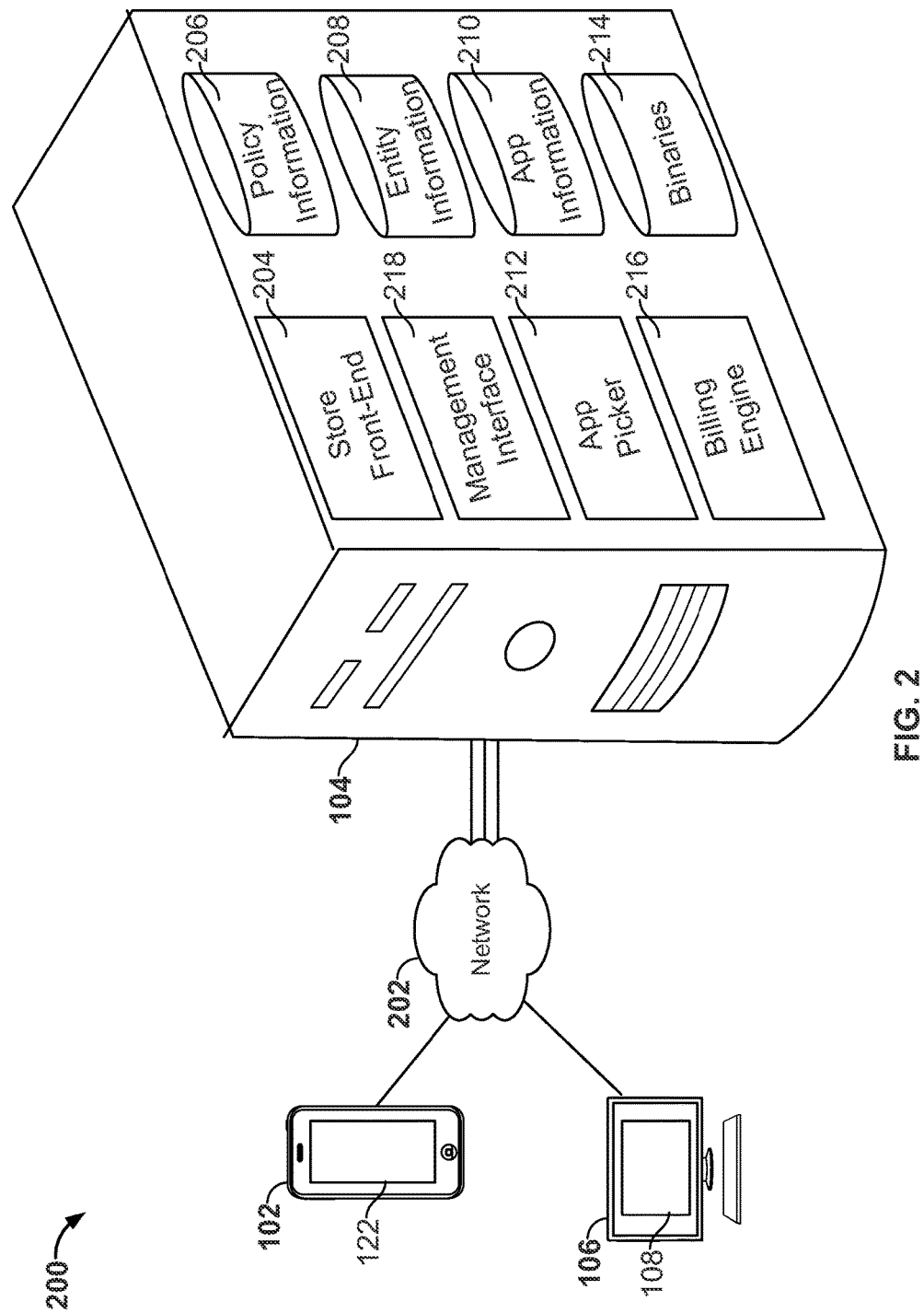
FIG. 2 shows a block diagram of an example system for implementing mobile application recommendations.

Referring now to FIG. 2, a block diagram of an example system 200 for implementing mobile application recommendations is shown. In general, the system 200 may be used to implement interactions like those discussed above and below, such as the identification at a public application marketplace of applications for an organization and the accessing of such identified applications by members of the organization.

The system 200 includes the user device 102, application marketplace server 104, and administrator device 106 of FIG. 1. In this example, the system 200 further includes at least one network 202. The network 202 is a bi-directional data communication path such that data may be transferred among the elements of the system 200. Examples of such a network include any of a number of wireless or hardwired WAN, LAN, Internet, or other packet-based communication networks.

In general, the system 200 may implement the techniques discussed above with respect to FIG. 1, and below with respect to FIGS. 3-6. However, any limits on the structure of functionality of a component in one figure are not to necessarily be implied to components in other figures.

Example A

Referring to FIGS. 1 and 2 in combination, in one example scenario, and as part of a "policy-implementation phase," a particular user may interact with the browser 122 (or a native application) on the user device 102 to request access to a web page managed by the application marketplace server 104 (e.g., "http://application.marketplace.com"). A front end 204 of the application marketplace server 104 may receive the request for access, and may query one or both of a policy database 206 and an entity database 208 of the application marketplace server 104 to correlate the user device 102 with a particular business entity that has been pre-registered with the application marketplace server 204.

In this example, and when the corporate e-mail address is matched to the credentialing information of the particular entity, the front end 204 may query an application database 210 of the application marketplace server 104, and may return content to the user device 102, where the content includes information that indicates that mobile applications are available for download and installation to the user device 102. For example, the content may include, among other things, data that is associated with one or more user-selectable icons and is retrieved from the application database 210. The icon(s) may be organized into at least the first listing 124, and in some implementations, may be organized into the second listing 126 for display within the browser 122 on the user device 102.

In general, the user-selectable icon(s) and the control 128 may be rendered by the browser 122. The control 128, when optionally selected by a user who has accessed the marketplace particular user, may instantiate a procedure that downloads and installs to the user device 102 each of the mobile applications that were displayed within the first listing 124 and the second listing 126. For example, and in response to selection of the control 128, the front end 204 of the application marketplace server 104 may receive a request to download and install each of the mobile applications that are displayed within the first listing 124 and the second listing 126, and may transfer the request to an application picker 212. In such an example, the application picker 212 may query a binaries database 214 and may return to the mobile device 102, and for installation, application code associated with each of the mobile applications that are displayed within the first listing 124 and the second listing 126. Such code may be downloaded to a marketplace client in the mobile device 102, where the marketplace client may be responsible for presenting marketplace information to a user, managing the downloads from the client side, and installing the applications and their associated data on the device 102.

Subsequently, a billing engine 216 of the application marketplace server 104 may automatically charge a business account that has been associated with the particular organization for the download of the mobile applications that was displayed within the first listing 124, and may charge a personal account associated with the employee for the mobile applications that was displayed within the second listing 126.

An example embodiment of the "policy-implementation phase" as briefly described here is discussed in further detail below in connection with FIG. 3A.

Example B

In another example scenario, and as part of a "policy-definition phase," an IT administrator associated with the particular business entity may interact with the interface 108 on the administrator device 106 to request access to the policy database 206 and the entity database 208 of the application marketplace server 104. A management interface 218 of the application marketplace server 104 may receive the request to access to the policy database 206 and the entity database 208, and may permit the IT administrator to interact with the interface 108 to create or define (e.g., within the policy database 206) an instance of a policy that is associated with the particular administrator or an account of the administrator's business entity, and register (e.g., with the entity database 208) with the application marketplace server 104 the particular business entity (e.g., by at least identifying the particular business entity and supplying credentialing information that is specific to the particular business entity). In some implementations, the management interface 218 of the application marketplace server 104 may additionally permit the IT administrator to interact with the interface 108 to create or define at least one billing account within or otherwise associated with the policy such that any mobile applications downloaded and installed to the user device 102 when the user device is logged in using credentials associated with the business entity (e.g., as part of the "policy-implementation phase" described below in connection with FIG. 3A) may be properly charged and paid for.

An example implementation of the "policy-definition phase" as briefly described here is discussed in further detail below in connection with FIG. 3B.

Figure 3A:
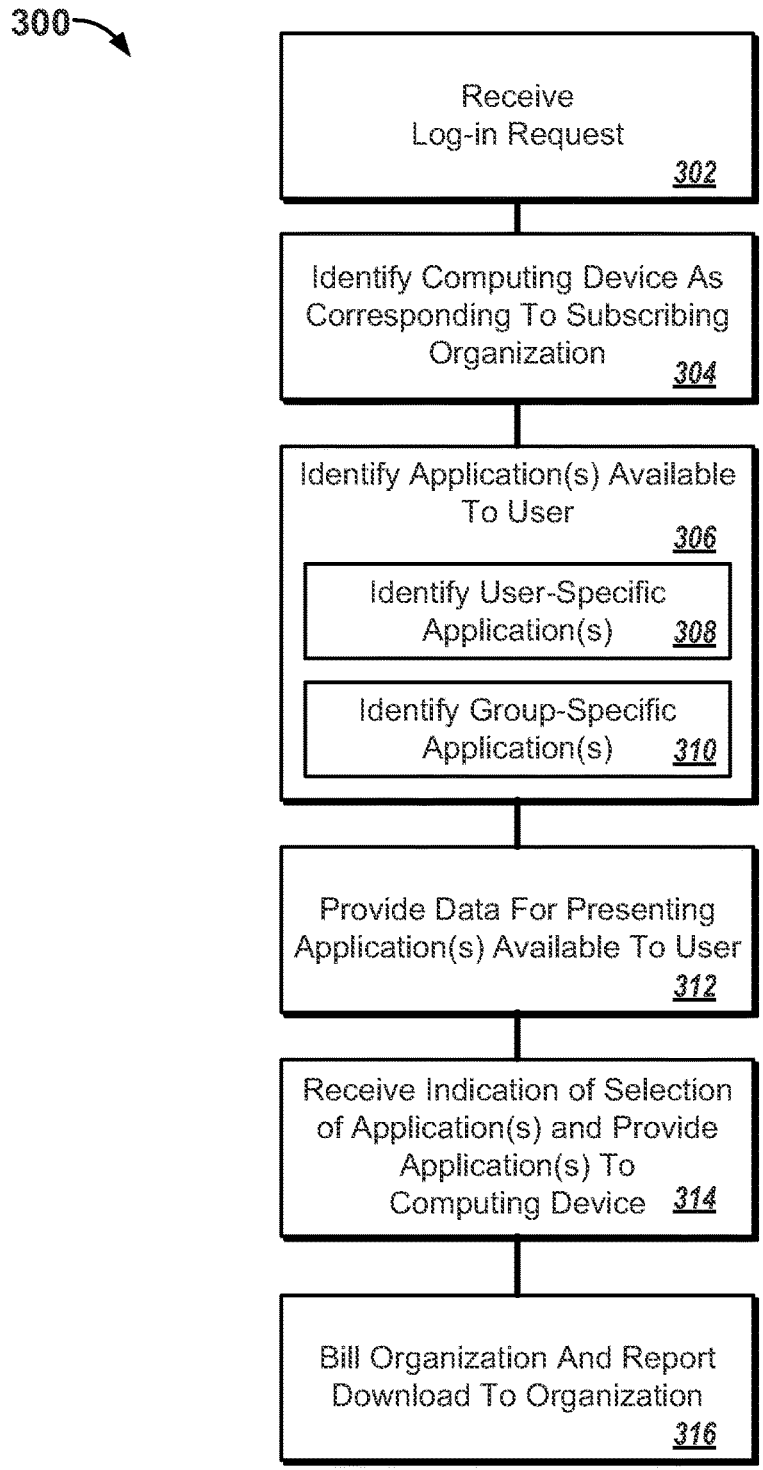
FIGS. 3A and 3B show first and second example processes for implementing mobile application recommendations.
Figure 3B:
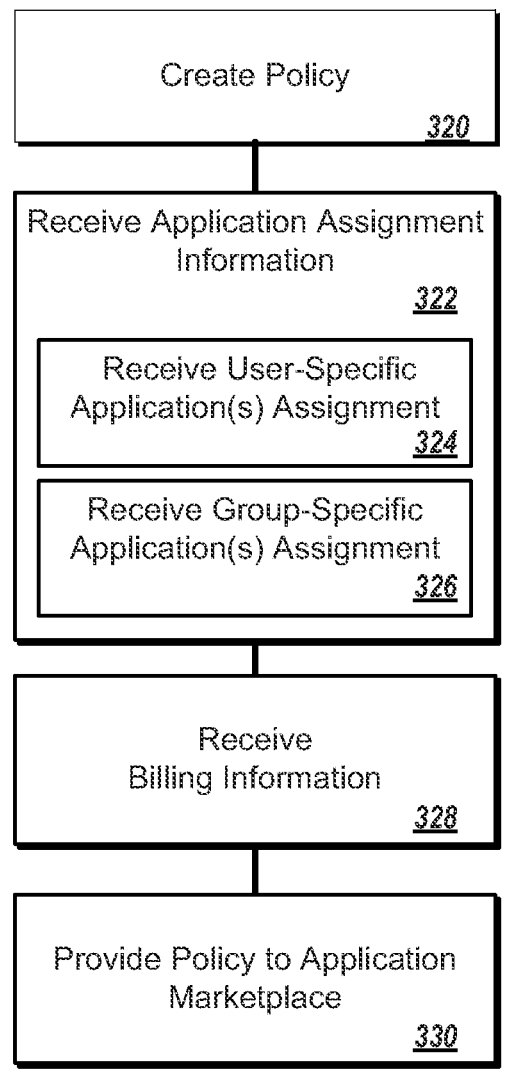

FIGS. 3A-3B generally show a first example process 300 and a second example process 318, respectively, for implementing mobile application recommendations in accordance with the present disclosure. In particular, the first example process 300 corresponds to a "policy-implementation phase" for policy-based mobile application recommendations, and the second example process 318 corresponds to a "policy-definition phase" for policy-based mobile application recommendations. The policy-definition phase corresponds to steps that can be taken by an administrator for an organization to identify particular applications that should be filtered and grouped to be made available to particular users who correspond to the organization. The policy-implementation phase corresponds to steps that may be taken to show such selected applications to a particular user who is identified as being a user who corresponds to the organization (e.g., an employee of the organization who has an e-mail address whose domain is controlled by the organization).

The respective processes 300 and 318 are described with reference to the user device 102, application marketplace server 104, and administrator device 106 of FIGS. 1-2, along with the same particular user and particular business entity. However, the steps described with respect to the example processes 300 and 318 may be supplemented, rearranged, and performed by different individuals and entities, and on different types of systems and/or devices, as appropriate.

Referring now specifically to FIG. 3A, the first example process 300, which corresponds to a "policy-implementation phase" for policy-based mobile application recommendations, is shown. In general, when a particular user accesses the online application marketplace as implemented by the application marketplace server 104 using the user device 102, at least a first listing of mobile applications may be presented to the user based on their association with a particular business entity. In this example, the first listing of mobile applications is "surfaced" or "recommended" to the particular user based on a record or policy that is pre-defined by an administrative entity associated with the particular business entity.

For example, at 302, a request is received by the application marketplace server 104 to access the online software store of the application marketplace server 104. For example, a particular user (e.g., "Broten, Neal") associated with a particular business entity (e.g., "BigCo, Inc.") may interact with a client application (e.g., browser 122) of the user device 102 to enter a URL address that references a home web page associated with the application marketplace server 104. In general, the request may include at least one credential that uniquely identifies the user device 102, and/or the particular user of the user device 102.

For example, at 302, a corporate e-mail address used by the user to sign-in to the user device 120 may be provided to the application marketplace server 104 as part of the access request. In another example, a network identifier that specifies one or more communication networks operated by the particular business entity and used by the user device 102 to access networked resources may be supplied to the application marketplace server 104 as part of the access request. In both of these examples, the credential(s) is transferred to the application marketplace server 104 without further input required from the particular user (e.g., without any additional manual input). For example, the user is not required to install a separate application to the user device 102 and/or sign-in to other applications in order to benefit from the mobile application recommendation functionality of the present disclosure. In this manner, there is no additional configuration or setup required by the particular user.

At 304, the application marketplace server 104 identifies the user device 102 as associated to the particular business entity, the business entity being pre-registered with the application marketplace server 104, based on the credential(s) received at 302. For example, the application marketplace server 104 may compare the corporate e-mail address used by the user to sign-in to the user device 120 against credentialing information for each one of a plurality of business entities registered with the application marketplace server 104 to identify or determine that the user device 102 is associated with the particular business entity. In this example, when the corporate e-mail address is matched to the credentialing information of the particular entity, the user device 102 (and ultimately the particular user) is linked to or with the particular entity by the application marketplace server 104.

At 306, the application marketplace server 104 identifies, based on the linking of the user device 102 to the particular entity at 304, at least one mobile application recommended by an individual (e.g., an IT administrator) for download and installation to the user device 102. In general, this may correspond to the application marketplace server 104 associating the user device 102 with at least one policy that specifies, as a recommendation to the particular user, one or more "user-specific" applications (at 308) and/or one or more "group-specific" applications (at 310) for download and installation to the user device 102.

For example, at 308, the application marketplace server 104 may associate a policy (e.g., policy 110) with the user device 102 that specifies mobile applications for recommendation to the particular user of the user device 102 as an individual. For example, an IT administrator may define a policy that includes a mobile application built specifically for the particular individual (e.g., "Neal's Tool" as shown in FIG. 1) to improve or enhance that individuals' ability to perform their job function.

At 310, in contrast, the application marketplace server 104 may associate a policy (e.g., the same or different policy referred to at 308) with the user device 102 that specifies mobile applications for recommendation to a grouping of individuals, the particular user being a part of or associated with the grouping of individuals. In this example, the grouping of individuals may be categorized together based on a common characteristic or property (e.g., job function, business unit association(s), etc.). For example, the IT administrator may define a policy that specifies mobile applications that would benefit a "Sales" team or other type of professional grouping that the particular user may be associated with. In this manner, the application marketplace server 104 may identify mobile applications available to the particular user that are both specific to the particular user as an individual (e.g., "user-specific"), and specific to a group in which the particular user is associated with (e.g., "group-specific").

At 312, the application marketplace server 104 provides, for presentation on or by the client application of the user device 102 and based on the mobile application(s) identified at 310, information indicating that mobile applications are available for download and installation to the user device 102. For example, data associated with one or more user-selectable icons may be provided to the user device 102 for presentation within the client application on the user device 102. In this example, the icon(s) may be organized into at least a first category (e.g., first listing 124) that includes mobile applications previously specified by the IT administrator within at least one policy and, in some implementations, into a second category (e.g., second listing 126) that includes mobile applications that are commonly presented to consumers who access the application marketplace server 104. In this example, mobile applications listed within the second category are not specified by the IT administrator within any particular policy, and instead may be mobile applications that are surfaced to consumers as they access the online software store of the application marketplace server (e.g., mobile applications listed within a "Top Paid Apps" section of a home web page of the online software store).

At 314, the application marketplace server 104 receives an indication that one or more mobile applications have been selected by the particular user for download and installation to the user device 102, and provides application data (e.g., an executable file) to the user device 102 such that the respective application(s) may be installed to the user device 102. For example, the particular user may select an icon (e.g., control 128) within the client application to download and install each of the mobile applications presented to the user at 312 in a single action. In another example, the particular user may individually select (e.g., by voice command, such as "download application X") particular ones of the mobile applications presented to the user in the client application for download and installation to the user device 102.

At 316, the application marketplace 104 may automatically report and charge an account associated with the particular business entity for mobile applications recommended by the particular business (e.g., those mobile applications listed within the first listing 124) that were downloaded from the application marketplace server 104. In some implementations, the application marketplace 104 may automatically report and charge a personal account associated with the particular user for mobile applications that were downloaded from the application marketplace server 104 but not recommended by the particular business (e.g., those listed within the second listing 126). As described in further detail below, the application marketplace server 104 may determine or resolve personal and/or business account information at 316 based on one or more definitions within the at least one policy associated with the user device 102.

Referring now to FIG. 3B, the second example process 318 for implementing mobile application recommendations is shown. As mentioned above, the second example process 318 corresponds to a "policy-definition phase" for policy-based mobile application recommendations. In general, the IT administrator, for example, associated with the particular business entity (e.g., "BigCo, Inc.") may log-in to a dashboard interface (e.g., interface 108) provided by the administrator device 106 for the purpose of defining at least one record or policy such that when the particular user (e.g., "Broten, Neal") accesses the application marketplace server 104 using the user device 102, at least a first listing of mobile applications (e.g., first listing 124) may be presented to the particular user based on their association with the particular business entity.

For example, at 320, the IT administrator may create an instance of a policy (e.g., policy 110) that is associated with the particular user, and associate the policy with the particular business entity. For example, the IT administrator may include within the policy at least one credential such as a corporate e-mail address/password combination used by the particular user to sign-in to the user device 120, or a network identifier that specifies one or more communication networks operated by the particular business entity and used by the particular user (e.g., via the user device 102) to access various networked or online resources. In this example, and as described above, when the credential(s) is matched to credentialing information of the particular business entity previously defined or supplied to the application marketplace server 104, the user device 102 (and ultimately the particular user) is linked to or with the particular business entity by the application marketplace server 104.

At 322, the IT administrator may select one or more mobile applications from a plurality of applications listed within the dashboard interface for placement within the policy. In general, this may correspond to the IT administrator selecting one or more "user-specific" applications (at 324) for inclusion (or exclusion) within the policy, and/or one or more "group-specific" applications (at 326) for inclusion (or exclusion) within the policy.

For example, at 324, the IT administrator may optionally select a particular mobile application (e.g., mobile application 112) from a plurality of applications listed within the dashboard interface (e.g., within general pane 114) for placement to one of: a first area within the dashboard interface associated with publicly-available mobile applications (e.g., public pane 116); a second area within the dashboard interface associated privately-available mobile applications (e.g., private pane 118); and a third area within the dashboard interface associated with mobile applications that are designed as restricted from being downloaded and installed to the user device (e.g., filter pane 120).

At 326, in contrast, the IT administrator may populate the policy with mobile applications, as a recommendation to the particular user of the user device 120, based on a pre-defined association or assignment of the particular user with or to a grouping of individuals categorized together based on a common characteristic or property (e.g., job function). For example, the IT administrator may optionally select a particular grouping (e.g., "Sales") from a plurality of groupings listed within the dashboard interface for placement to the policy associated with the particular user. In these examples (at 322), the IT administrator has the capability to identify and populate mobile applications within the policy associated with the particular user that are both specific to the particular user as an individual, and specific to a group in which the particular user is associated with.

At 328, the IT administrator may specify or populate at least one billing account within the policy such that any mobile applications downloaded and installed to the user device 102 (e.g., as part of the policy-implementation phase of FIG. 3A) may be properly charged and paid for. For example, the IT administrator may specify a corporate account that is charged when mobile applications as recommended by the particular entity (e.g., mobile applications specified within the first listing 124) are downloaded and installed the user device 102. In another example, the IT administrator may specify a personal account that is charged when mobile applications not recommended by the particular entity (e.g., mobile applications specified within the second listing 124) are downloaded and installed the user device 102. In this manner, the appropriate entities are billed and charged for mobile application downloads to the user device 102.

At 330, and following creation and definition of the policy at 320-328, the policy may be forwarded to the application marketplace server 104 such that when the particular user accesses, using the user device 102, the online application marketplace as implemented by the application marketplace server 104 (e.g., as part of the policy-implementation phase of FIG. 3A), at least a first listing of mobile applications (e.g., first listing 124) may be presented to the user within the client application based on their association with the particular business entity.

Figure 4:
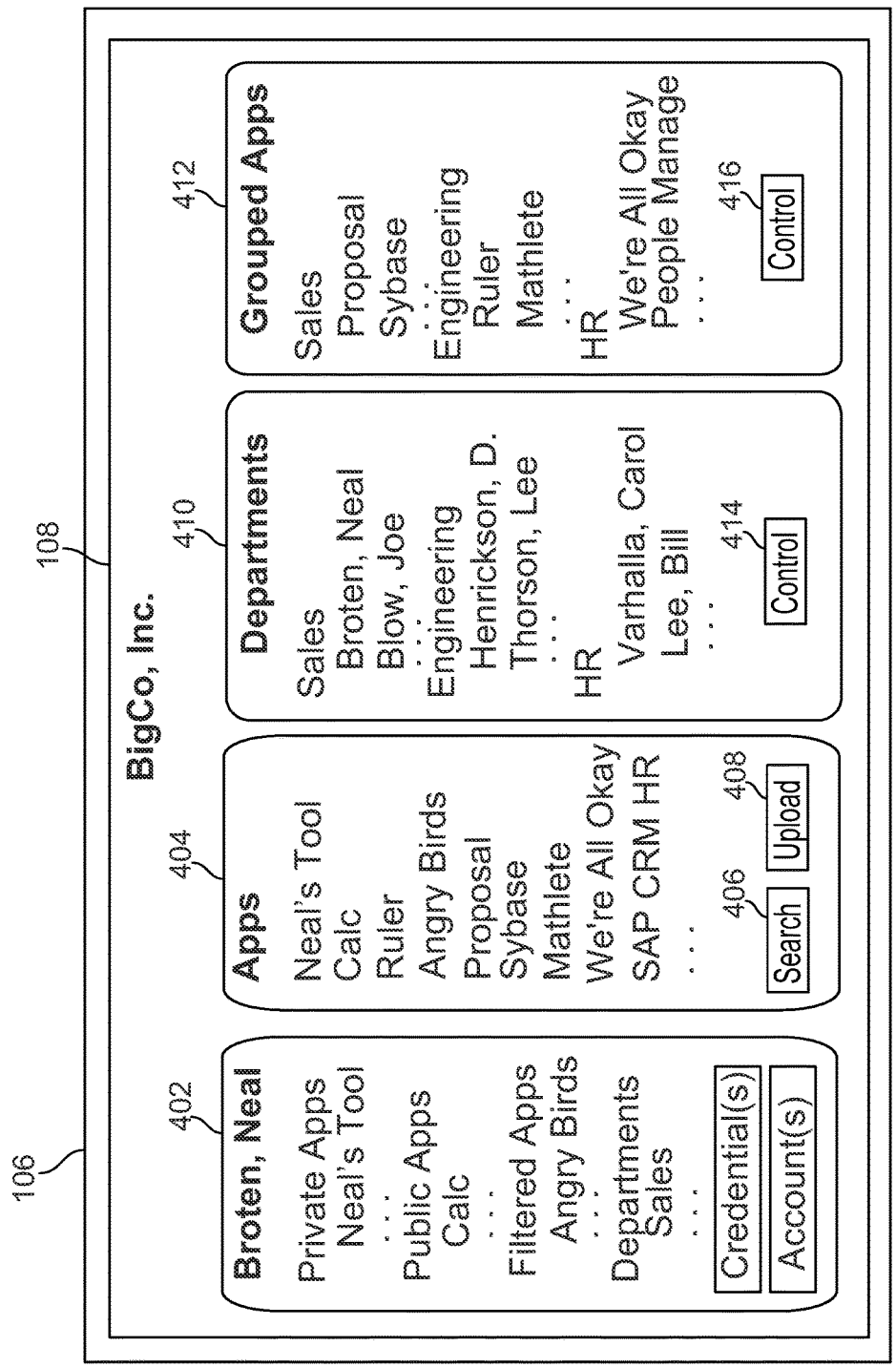
FIG. 4 shows an example administrative interface for implementing mobile application recommendations.

Referring now to FIG. 4, an example administrative interface for implementing mobile application recommendations is shown. Although not so limited, the example interface is described with reference to the user device 102, application marketplace server 104, and administrator device 106 of FIGS. 1-3. In particular, FIG. 4 shows another example of the interface 108 provided by the administrator device 106 in detail. In this example, a policy 402 associated with employee "Broten, Neal" of business entity "BigCo, Inc." is shown including a "Private Apps" listing, a "Public Apps" listing, a "Filtered Apps" listing, and a "Departments" listing. In this example, the policy 402 further includes a "User Credential(s)" element and an "Account(s)" element. In general, the respective portions of the policy 402 may be defined or specified by an IT administrator associated with the business entity "BigCo, Inc." Subsequently, as the employee "Broten, Neal" accesses, using the user device 102, the online software marketplace as implemented by the application marketplace server 104, one or more mobile applications may be "surfaced" or "recommended" to "Broten, Neal" based on the policy 402.

For example, the "User Credential(s)" element within the policy 402 may be a user-selectable control that when selected by the IT administrator allows the IT administrator to define at least one credential (e.g., corporate username/password combination) that uniquely identifies the user device 102 and/or employee "Broten, Neal." In this example, when "Broten, Neal" accesses the application marketplace server 104 using the user device 102, the application marketplace server 104 may match the credential(s) to credentialing information (e.g., a unique identifier) for the business entity "BigCo, Inc.," as discussed above.

Similarly, the "Accounts" entry within the policy 402 may be a user-selectable control that when selected by the IT administrator allows the IT administrator to define a business account and/or a personal account that may be charged by the application marketplace server 104 when "Broten, Neal" downloads and installs mobile applications to the user device 102. For example, mobile applications recommended by the business entity "BigCo, Inc." that are downloaded and installed to the user device 102 (e.g., mobile applications listed within the first listing 124) may be charged to a "BigCo, Inc." business account, and mobile applications not recommended by the business entity "BigCo, Inc." that are downloaded and installed to the user device 102 (e.g., mobile applications listed within the second listing 126) may be charged to a "Broten, Neal" personal account.

Additionally, one or more mobile applications listed within a first pane 404 of the interface 108 may be selected for placement (e.g., via "drag and drop") to one of the "Private Apps" listing, "Public Apps" listing, or "Filtered Apps" listing within the policy 402 by the IT administrator. For example, the IT administrator may select the mobile application "Angry Birds" from the first pane 404 and place this application within the "Filtered Apps" listing within the policy 402 to effectively "black-list" or prevent this mobile application from being "exposed" or "surfaced" to "Broten, Neal" as he uses the user device 102 to access the application marketplace server 104. Since placement of mobile applications to the "Filtered Apps" listing prevents the same from being exposed to "Broten, Neal" as he browses features of the application marketplace server 104, in this example, placement of the mobile application "Angry Birds" to the "Filtered Apps" listing at least temporarily prevents "Broten, Neal" from downloading and installing this mobile application to the user device 102. For example, the IT administrator may determine the mobile application "Angry Birds" is a distraction and may prevent "Broten, Neal" from being productive in his job.

In a similar manner to placing mobile applications listed within the first pane 404 to the "Filtered Apps" listing within the policy 402, other mobile applications may be selected for placement to the "Private Apps" listing and the "Public Apps" listing as desired. In such instances, the IT administrator provides, as a recommendation to "Broten, Neal," one or more "user-specific" applications for download and installation to the user device 102. As discussed in further detail below, the IT administrator may also provide one or more "group-specific" applications for download and installation to the user device 102 as a recommendation to "Broten, Neal."

In the example of FIG. 4, the first pane 404 also at least includes a search control 406 and an upload control 408. In one implementation, the search control 406 may be used by the IT administrator to locate mobile applications registered with the application marketplace server 104. For example, the IT administrator may select (e.g., by "pointing and clicking") the search control 406 to enter one or more key terms (e.g., "sales applications") within a text field (not shown) to query the application marketplace server 104 for mobile applications associated with the one or more key terms. In general, results of the query may be listed within the first pane 404 for optional selection by the IT administrator for placement within the policy 402.

The upload control 408 in contrast may be used by the IT administrator to optionally provide one or more mobile applications to the application marketplace server 104. For example, the IT administrator may select the upload control 408 and navigate to a file path (e.g., c:\binaries\Neals.Tool.apk) to upload a particular mobile application to the application marketplace server 104. In this example, the uploaded mobile application may be automatically listed within the first pane 404 for selection by the IT administrator, or may at least be discoverable (e.g., via search control 406) by the IT administrator for optional population within, for example, the policy 402.

In the example of FIG. 4, the interface 108 further includes a second pane 410 and a third pane 412. In general, the second pane 410 and the third pane 412 may be optionally used by the IT administrator to define (e.g., via the second pane 410) one or more groupings of individuals that may be categorized together based on a common characteristic or property (e.g., job function). The IT administrator may then associate (e.g., via the third pane 412) one or more mobile applications with a particular grouping of individuals and then optionally select a particular grouping (e.g., "Sales") for placement to, for example, the "Departments" listing within the policy 402. For example, the IT administrator may select a first grouping control 414 (e.g., by "pointing and clicking") within the second pane 410 that allows the IT administrator to both define a "Sales" grouping within the second pane 410, and populate the "Sales" grouping with one or more employees (e.g., "Broten, Neal") associated with the business entity "BigCo, Inc."

In tandem, the IT administrator may select a second grouping control 416 within the third pane 412 that allows the IT administrator to define the "Sales" grouping within the third pane 412. The IT administrator may then optionally select one or more mobile applications listed within the first pane 404 of the interface 108 for placement (e.g., by "dragging and dropping") to the "Sales" grouping within the third pane 412. For example, the "Sales" grouping may be populated with a "Proposal" mobile application and a "Sybase" mobile application. In this example, these respective mobile applications may have been determined by the IT administrator as potentially beneficial (e.g., to aid in job performance) for employees of the business entity "BigCo, Inc." that are generally involved in "Sales." Subsequently, the IT administrator may select the "Sales" grouping from the one of the second pane 410 and third pane 412 for placement (e.g., via "drag and drop") to the "Departments" listing within the policy 402. In such instances, the IT administrator provides a recommendation of one or more "group-specific" applications for download and installation to the user device 102 when the employee "Broten, Neal"

accesses the online software marketplace as implemented by the application marketplace server 104.

Figure 5:
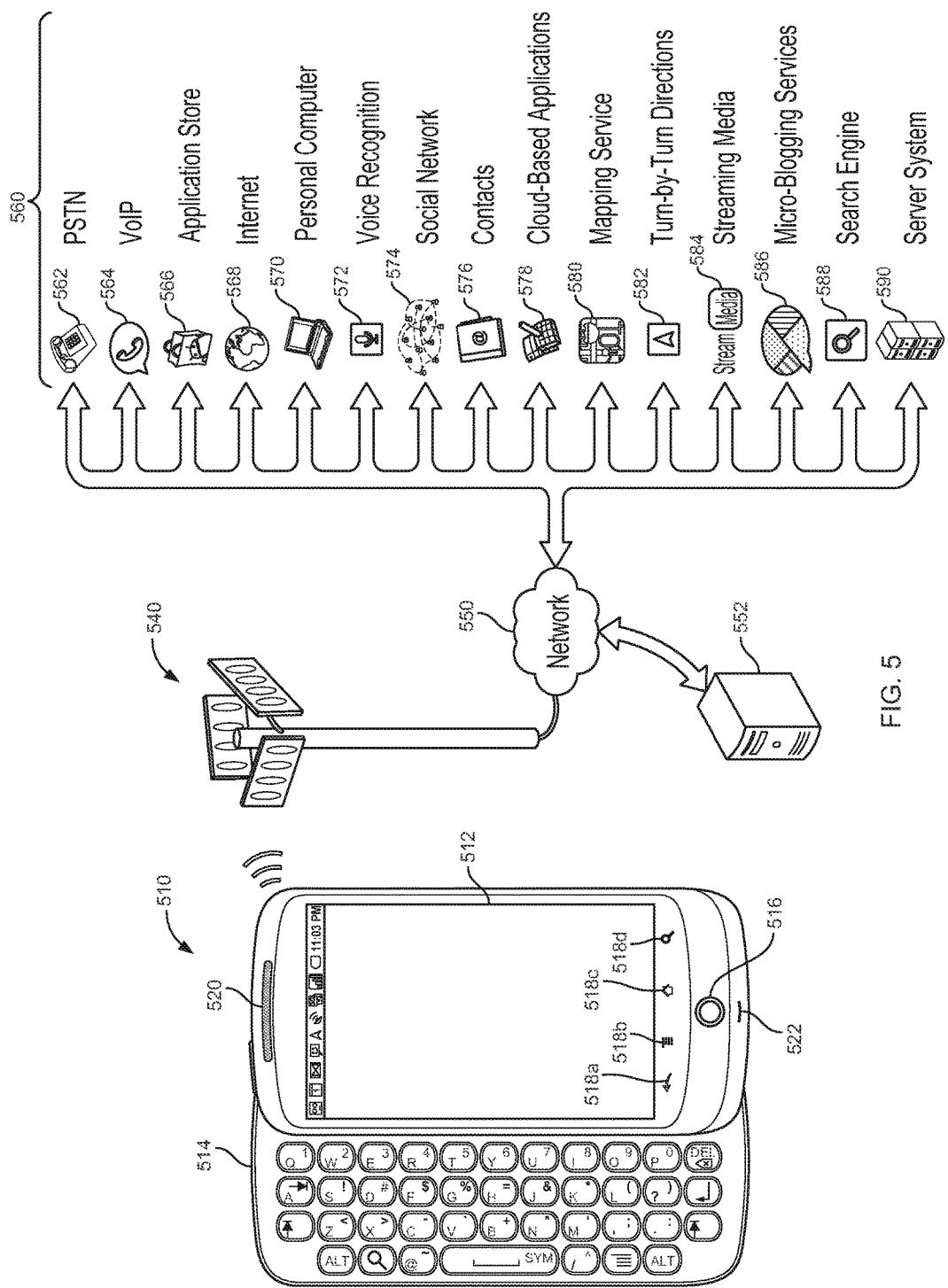
FIG. 5 shows a conceptual diagram of a system that may be used to implement the systems and processes described in this document.

Referring now to FIG. 5, a conceptual diagram of a system that may be used to implement the systems and methods described in this document is illustrated. Mobile computing device 510 can wirelessly communicate with base station 540, which can provide the mobile computing device wireless access to numerous services 560 through a network 550.

In this illustration, the mobile computing device 510 is depicted as a handheld mobile telephone (e.g., a smartphone or an application telephone) that includes a touch screen display device 512 for presenting content to a user of the mobile computing device 510. The mobile computing device 510 includes various input devices (e.g., keyboard 514 and touch screen display device 512) for receiving user-input that influences the operation of the mobile computing device 510. In further implementations, the mobile computing device 510 may be a laptop computer, a tablet computer, a personal digital assistant, an embedded system (e.g., a car navigation system), a desktop computer, or a computerized workstation.

The mobile computing device 510 may include various visual, auditory, and tactile user-output mechanisms. An example visual output mechanism is display device 512, which can visually display video, graphics, images, and text that combine to provide a visible user interface. For example, the display device 512 may be a 3.7 inch AMO-LED screen. Other visual output mechanisms may include LED status lights (e.g., a light that blinks when a voice-mail has been received).

An example tactile output mechanism is a small electric motor that is connected to an unbalanced weight to provide a vibrating alert (e.g., to vibrate in order to alert a user of an incoming telephone call or confirm user contact with the touch screen 512). Further, the mobile computing device 510 may include one or more speakers 520 that convert an electrical signal into sound, for example, music, an audible alert, or voice of an individual in a telephone call.

An example mechanism for receiving user-input includes keyboard 514, which may be a full qwerty keyboard or a traditional keypad that includes keys for the digits '0-9', '*', and '#.' The keyboard 514 receives input when a user physically contacts or depresses a keyboard key. User manipulation of a trackball 516 or interaction with a track pad enables the user to supply directional and rate of rotation information to the mobile computing device 510 (e.g., to manipulate a position of a cursor on the display device 512).

The mobile computing device 510 may be able to determine a position of physical contact with the touch screen display device 512 (e.g., a position of contact by a finger or a stylus). Using the touch screen 512, various "virtual" input mechanisms may be produced, where a user interacts with a graphical user interface element depicted on the touch screen 512 by contacting the graphical user interface element. An example of a "virtual" input mechanism is a "software keyboard," where a keyboard is displayed on the touch screen and a user selects keys by pressing a region of the touch screen 512 that corresponds to each key.

The mobile computing device 510 may include mechanical or touch sensitive buttons 518a-d. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 510 may present a graphical user interface with the touch screen 512. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touch screen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 504. User-selection of the button may invoke the pre-defined action.

In some examples, the operating system provides a "desktop" user interface that is displayed upon turning on the mobile computing device 510, activating the mobile computing device 510 from a sleep state, upon "unlocking" the mobile computing device 510, or upon receiving user-selection of the "home" button 518c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 510 operations. For example, a single-action user input (e.g., a single tap of the touch screen, swipe across the touch screen, contact with a button, or combination of these at a same time) may invoke an operation that changes a display of the user interface. Without the user-input, the user interface may not have changed at a particular time. For example, a multi-touch user input with the touch screen 512 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touch screen user-input within the portion of the desktop.

The mobile computing device 510 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 510 may include other application modules and hardware. A call handling unit may receive an indication of an incoming telephone call and provide a user capabilities to answer the incoming telephone call. A media player may allow a user to listen to music or play movies that are stored in local memory of the mobile computing device 510. The mobile telephone 510 may include a digital camera sensor, and corresponding image and video capture and editing software. An internet browser may enable the user to view content from a web page by typing in an addresses corresponding to the web page or selecting a link to the web page.

The mobile computing device 510 may include an antenna to wirelessly communicate information with the base station 540. The base station 540 may be one of many base stations in a collection of base stations (e.g., a mobile telephone cellular network) that enables the mobile computing device 510 to maintain communication with a network 550 as the mobile computing device is geographically moved. The computing device 510 may alternatively or additionally communicate with the network 550 through a Wi-Fi router or a wired connection (e.g., Ethernet, USB, or FIREWIRE). The computing device 510 may also wirelessly communicate with other computing devices using BLUETOOTH protocols, or may employ an ad-hoc wireless network.

A service provider that operates the network of base stations may connect the mobile computing device 510 to the network 550 to enable communication between the mobile computing device 510 and other computerized devices that provide services 560. Although the services 560 may be provided over different networks (e.g., the service provider's internal network, the Public Switched Telephone Network, and the Internet), network 550 is illustrated as a single network. The service provider may operate a server system 552 that routes information packets and voice data between the mobile computing device 510 and computing devices associated with the services 560.

The network 550 may connect the mobile computing device 510 to the Public Switched Telephone Network (PSTN) 562 in order to establish voice or fax communication between the mobile computing device 510 and another computing device. For example, the service provider server system 552 may receive an indication from the PSTN 562 of an incoming call for the mobile computing device 510. Conversely, the mobile computing device 510 may send a communication to the service provider server system 552 initiating a telephone call with a telephone number that is associated with a device accessible through the PSTN 562.

The network 550 may connect the mobile computing device 510 with a Voice over Internet Protocol (VoIP) service 564 that routes voice communications over an IP network, as opposed to the PSTN. For example, a user of the mobile computing device 510 may invoke a VoIP application and initiate a call using the program. The service provider server system 552 may forward voice data from the call to a VoIP service, which may route the call over the internet to a corresponding computing device, potentially using the PSTN for a final leg of the connection.

An application store 566 may provide a user of the mobile computing device 510 the ability to browse a list of remotely stored application programs that the user may download over the network 550 and install on the mobile computing device 510. The application store 566 may serve as a repository of applications developed by third-party application developers. An application program that is installed on the mobile computing device 510 may be able to communicate over the network 550 with server systems that are designated for the application program. For example, a VoIP application program may be downloaded from the Application Store 566, enabling the user to communicate with the VoIP service 564.

The mobile computing device 510 may access content on the internet 568 through network 550. For example, a user of the mobile computing device 510 may invoke a web browser application that requests data from remote computing devices that are accessible at designated universal resource locations. In various examples, some of the services 560 are accessible over the internet.

The mobile computing device may communicate with a personal computer 570. For example, the personal computer 570 may be the home computer for a user of the mobile computing device 510. Thus, the user may be able to stream media from his personal computer 570. The user may also view the file structure of his personal computer 570, and transmit selected documents between the computerized devices.

A voice recognition service 572 may receive voice communication data recorded with the mobile computing device's microphone 522, and translate the voice communication into corresponding textual data. In some examples, the translated text is provided to a search engine as a web query, and responsive search engine search results are transmitted to the mobile computing device 510.

The mobile computing device 510 may communicate with a social network 574. The social network may include numerous members, some of which have agreed to be related as acquaintances. Application programs on the mobile computing device 510 may access the social network 574 to retrieve information based on the acquaintances of the user of the mobile computing device. For example, an "address book" application program may retrieve telephone numbers for the user's acquaintances. In various examples, content may be delivered to the mobile computing device 510 based on social network distances from the user to other members. For example, advertisement and news article content may be selected for the user based on a level of interaction with such content by members that are "close" to the user (e.g., members that are "friends" or "friends of friends").

The mobile computing device 510 may access a personal set of contacts 576 through network 550. Each contact may identify an individual and include information about that individual (e.g., a phone number, an e-mail address, and a birthday). Because the set of contacts is hosted remotely to the mobile computing device 510, the user may access and maintain the contacts 576 across several devices as a common set of contacts.

The mobile computing device 510 may access cloud-based application programs 578. Cloud-computing provides application programs (e.g., a word processor or an e-mail program) that are hosted remotely from the mobile computing device 510, and may be accessed by the device 510 using a web browser or a dedicated program. Example cloud-based application programs include GOOGLE DOCS word processor and spreadsheet service, GOOGLE GMAIL web-mail service, and PICASA picture manager.

Mapping service 580 can provide the mobile computing device 510 with street maps, route planning information, and satellite images. An example mapping service is GOOGLE MAPS. The mapping service 580 may also receive queries and return location-specific results. For example, the mobile computing device 510 may send an estimated location of the mobile computing device and a user-entered query for "pizza places" to the mapping service 580. The mapping service 580 may return a street map with "markers" superimposed on the map that identify geographical locations of nearby "pizza places."

Turn-by-turn service 582 may provide the mobile computing device 510 with turn-by-turn directions to a user-supplied destination. For example, the turn-by-turn service 582 may stream to device 510 a street-level view of an estimated location of the device, along with data for providing audio commands and superimposing arrows that direct a user of the device 510 to the destination.

Various forms of streaming media 584 may be requested by the mobile computing device 510. For example, computing device 510 may request a stream for a pre-recorded video file, a live television program, or a live radio program. Example services that provide streaming media include YOUTUBE and PANDORA.

A micro-blogging service 586 may receive from the mobile computing device 510 a user-input post that does not identify recipients of the post. The micro-blogging service 586 may disseminate the post to other members of the micro-blogging service 586 that agreed to subscribe to the user.

A search engine 588 may receive user-entered textual or verbal queries from the mobile computing device 510, determine a set of internet-accessible documents that are responsive to the query, and provide to the device 510 information to display a list of search results for the responsive documents. In examples where a verbal query is received, the voice recognition service 572 may translate the received audio into a textual query that is sent to the search engine.

These and other services may be implemented in a server system 590. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 6:
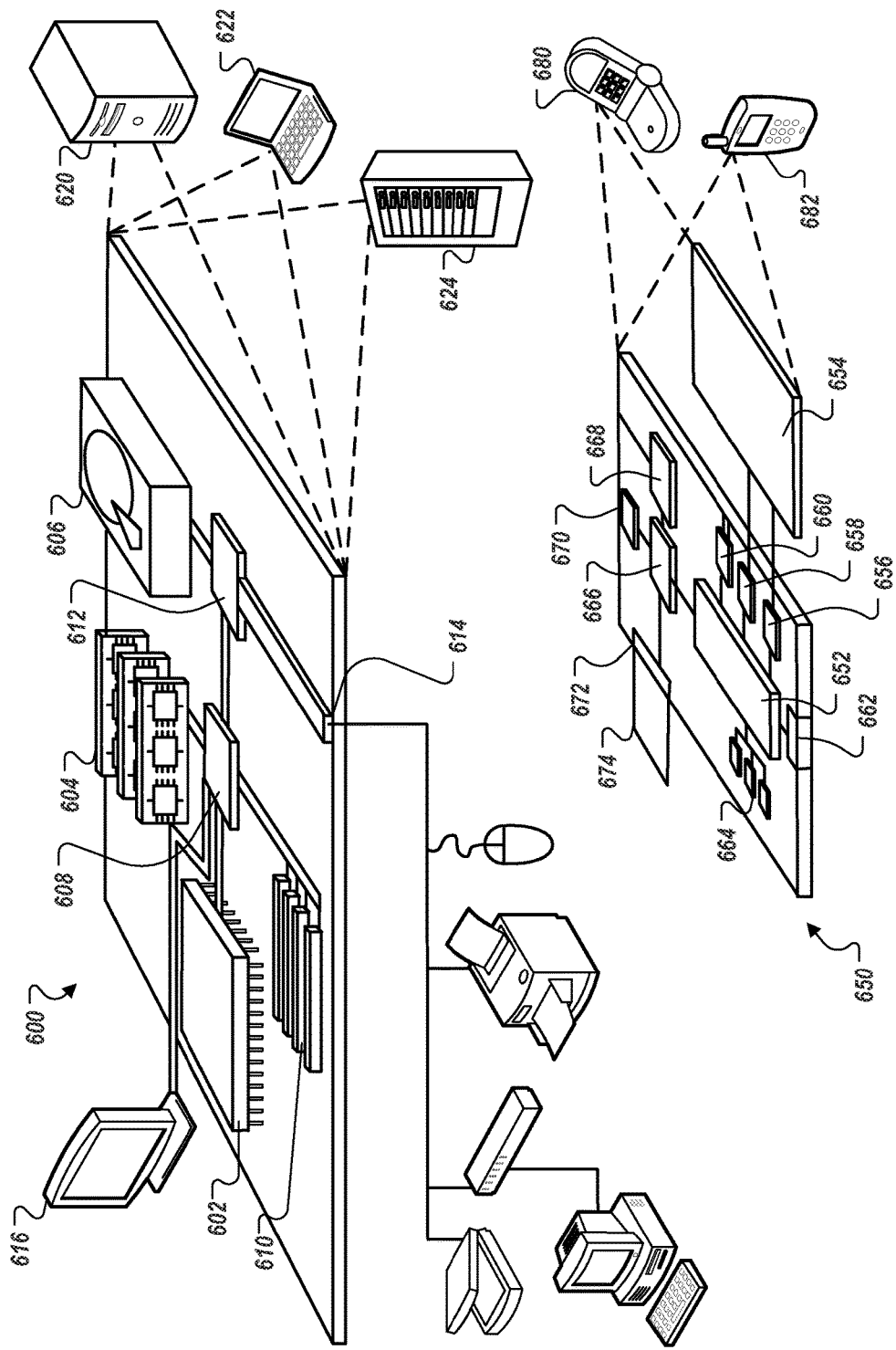
FIG. 6 shows an example of a computing device and a mobile computing device that may be used to implement systems and processes described in this document.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be examples only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
    determining, by a system operating an online application marketplace that is open to the public, that a computing device accessing the online application marketplace is associated with a particular business registered with the online application marketplace;
    identifying the particular business from among a plurality of separate businesses that are separately authorized to acquire applications from the application marketplace for their members, wherein particular ones of the businesses have accounts with the application marketplace that are separate from accounts of others of the businesses;
    identifying, by the system and based on identifying the particular business from among the plurality of business, a policy associated with the particular business;
    identifying, by the system, a first plurality of applications associated with the identified policy that were selected by a representative of the particular business to be identified to users whose devices are determined to be associated with the particular business;
    identifying a second plurality of applications that are available to the general public;
    providing, from the system to the computing device for presentation on the computing device, data for displaying the first plurality of applications in a first portion of a display, the second plurality of applications in a second portion of the display separate from the first portion, and a control for downloading executable code for at least one of the first plurality of applications or the second plurality of applications;
    receiving, at the system, an indication that the control has been selected by the user to download the executable code for the at least one of the first plurality of applications or the second plurality of applications;
    providing, from the system to the computing device, the executable code for the at least one of the first plurality of applications or the second plurality of applications such that after installation, applications from the first plurality of applications are displayed in a first group and applications from the second plurality of applications are displayed in a second group that is visually separated from the first group.

2. The method of claim 1, wherein determining that the computing device accessing the online application marketplace is associated with the particular business is performed by determining that the computing device is accessing the online application marketplace from a network operated by the particular business in distinction to a network operated by one of the other of the businesses that are separately authorized to acquire applications from the application marketplace for their members.

3. The method of claim 1, wherein identifying the particular business from among a plurality of separate businesses that are separately authorized to acquire applications from the application marketplace for their members is performed by determining that the computing device is signed into an account for the online application marketplace using an electronic mail address that has a domain that is controlled by the particular business.

4. The method of claim 1, wherein identifying the particular business from among a plurality of separate businesses that are separately authorized to acquire applications from the application marketplace for their members comprises consulting a policy that lists user ID's of users who are associated with the particular business, the list of user ID's having been provided by a representative of the particular business, and identifying the particular business by determining that the particular business controls a domain for the computing device.

5. The method of claim 4, wherein the user ID comprises a corporate e-mail address or a network identifier that specifies at least one communication network or network domain operated by the particular business.

6. The method of claim 1, further comprising
making available for download to the computing device, executable code for one or more of the first plurality of applications that were uploaded to the software application marketplace by the representative of the particular business, and made available only to users identified as being authorized to access the executable code by the representative, and
making available for download to the computing device, executable code for one or more of the second plurality of applications that were uploaded to the software application marketplace by representatives of a plurality of different organizations that make software for public acquisition, wherein the one or more other software applications are made available for acquisition by the general public.

7. The method of claim 1, further comprising billing an account of the particular business for a cost associated with downloading the at least one of the first plurality of applications or the second plurality of applications that was selected by the representative of the particular business, the account selected from a plurality of different accounts for the plurality of different businesses that are capable of being billed for costs associated with downloading applications.

8. The method of claim 1, further comprising selecting applications to be displayed to a user based on identifying the user's working role at the particular business.

9. The method of claim 8, wherein the user's role is determined based on a list of roles or user-by-user access identifiers that differ for different users who are associated with the particular business, and wherein different ones of the plurality of businesses have assigned different groups of applications to particular roles as compared to others of the plurality of businesses.

10. The method of claim 9, further comprising making available for download to the computing device, one or more applications that were uploaded to the online application marketplace by the representative of the particular business.

11. One or more machine-readable storage media having recorded thereon instructions, that when executed by one or more computer processors, perform operations comprising:
determining, by a system operating an online application marketplace that is open to the public, that a computing device accessing the online application marketplace is associated with a particular business registered with the online application marketplace;
identifying the particular business from among a plurality of separate businesses that are separately authorized to acquire applications from the application marketplace for their members, wherein particular ones of the businesses have accounts with the application marketplace that are separate from accounts of others of the businesses;
identifying, by the system and based on identifying the particular business from among the plurality of business, a policy associated with the particular business;
identifying, by the system, a first plurality of applications associated with the identified policy that were selected by a representative of the particular business to be identified to users whose devices are determined to be associated with the particular business;
identifying a second plurality of applications that are available to the general public;
providing, from the system to the computing device for presentation on the computing device, data for displaying the first plurality of applications in a first portion of a display, the second plurality of applications in a second portion of the display separate from the first portion, and a control for downloading executable code for at least one of the first plurality of applications or the second plurality of applications;
receiving at the system an indication that the control has been selected by the user to download the executable code for the at least one of the first plurality of applications or the second plurality of applications;
providing, from the system to the computing device, the executable code for the at least one of the first plurality of applications or the second plurality of applications such that after installation, applications from the first plurality of applications are displayed in a first group and applications from the second plurality of applications are displayed in a second group that is visually separated from the first group.

12. The machine-readable storage media of claim 11, wherein determining that the computing device accessing the online application marketplace is associated with the particular business is performed by:
determining that the computing device is accessing the online application marketplace from a network operated by the particular business, or
determining that the computing device is signed into an account for the online application marketplace using an electronic mail address that has a domain that is controlled by the particular business, in distinction to a network operated by one of the other of the businesses that are separately authorized to acquire applications from the application marketplace for their members.

13. The machine-readable storage media of claim 11, wherein the operations further comprise billing an account of the particular business for a cost associated with downloading the at least one of the first plurality of applications or the second plurality of applications that was selected by the representative of the particular business, the account selected from a plurality of different accounts for the plurality of different businesses that are capable of being billed for costs associated with downloading applications.

14. The machine-readable storage media of claim 11, wherein the operations further comprise selecting applications to be displayed to a user based on identifying the user's working role at the particular business.

15. A system comprising:
one or more processors; and
one or more machine-readable storage media having recorded thereon instructions, that when executed by the one or more computer processors, perform operations comprising:
determining, by a system operating an online application marketplace, that a computing device accessing the online application marketplace is associated with a particular business registered with the online application marketplace;
identifying the particular business from among a plurality of separate businesses that are separately authorized to acquire applications from the application marketplace for their members, wherein particular ones of the businesses have accounts with the application marketplace that are separate from accounts of others of the businesses;

identifying, by the system and based on identifying the particular business from among the plurality of business, a policy associated with the particular business;

identifying, by the system, a first plurality of applications associated with the identified policy that were selected by a representative of the particular business to be identified to users whose devices are determined to be associated with the particular business;

providing, from the system to the computing device for presentation on the computing device, data for displaying the first plurality of applications in a first portion of a display, the second plurality of applications in a second portion of the display separate from the first portion, and a control for downloading executable code for at least one of the first plurality of applications or the second plurality of applications;

receiving at the system an indication that the control has been selected by the user to download the executable code for the at least one of the first plurality of applications or the second plurality of applications;

providing, from the system to the computing device, the executable code for the at least one of the first plurality of applications or the second plurality of applications such that after installation, applications from the first plurality of applications are displayed in a first group and applications from the second plurality of applications are displayed in a second group that is visually separated from the first group.

16. The system of claim 15, wherein determining that the computing device accessing the online application marketplace is associated with the particular business is performed by:

determining that the computing device is accessing the online application marketplace from a network operated by the particular business, or determining that the computing device is signed into an account for the online application marketplace using an electronic mail address that has a domain that is controlled by the particular business, in distinction to a network operated by one of the other of the businesses that are separately authorized to acquire applications from the application marketplace for their members.

17. The system of claim 15, wherein the operations further comprise billing an account of the particular business for a cost associated with downloading the at least one of the first plurality of applications or the second plurality of applications that was selected by the representative of the particular business, the account selected from a plurality of different accounts for the plurality of different businesses that are capable of being billed for costs associated with downloading applications.

18. The system of claim 15, wherein the operations further comprise selecting applications to be displayed to a user based on identifying the user's working role at the particular business.

* * * * *